R. & V. WATERHOUSE.
HOOK.
APPLICATION FILED JAN. 2, 1909.

926,156.

Patented June 29, 1909.

Witnesses

Inventors
Rolla Waterhouse and Van Waterhouse
By Baldwin & Wight
their Attorneys

UNITED STATES PATENT OFFICE.

ROLLA WATERHOUSE AND VAN WATERHOUSE, OF FALLS CITY, OREGON.

HOOK.

No. 926,156.  Specification of Letters Patent.  Patented June 29, 1909.

Application filed January 2, 1909. Serial No. 470,506.

*To all whom it may concern:*

Be it known that we, ROLLA WATERHOUSE and VAN WATERHOUSE, both citizens of the United States, residing in Falls City, in the county of Polk and State of Oregon, have invented certain new and useful Improvements in Hooks, of which the following is a specification.

Our invention relates particularly to hooks of the class known as "butt-hooks" used by lumbermen in hauling logs, and the object of our invention is to provide a strong, durable and efficient hook of this kind which will take a firm hold on the chain or other object to which it is connected and which is so constructed that it will not catch into vines, underbrush or other obstructions in the path of the logs while being drawn.

In carrying out our invention we preferably pivot a hasp to the outer end of the shank of the hook and we provide a latch or mousing which is pivotally connected with the eye of the hook is free to turn about the axis of the pivot which connects the hasp with the hook. The latch or mousing carries a dog which serves to lock the latch or mousing when the hook is closed. The latch or mousing is recessed or so constructed as to inclose the dog and shield it, being open only on its under side in rear of the direction of travel so that the dog cannot be engaged by obstructions, but can be easily manipulated when it is desired to open the hook. The dog is operated in one direction by a spring and the mousing or latch is automatically locked when the dog is closed.

Figure 1:
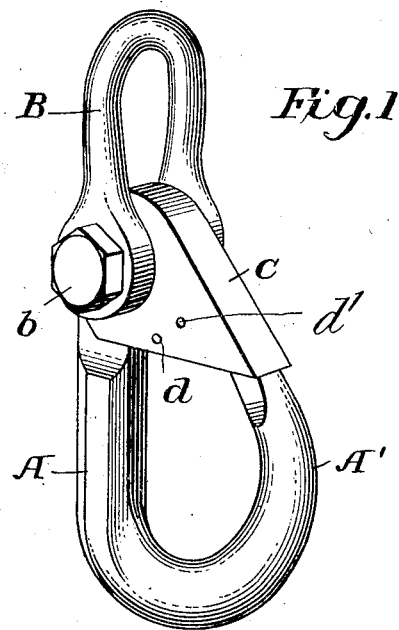
Figure 2:
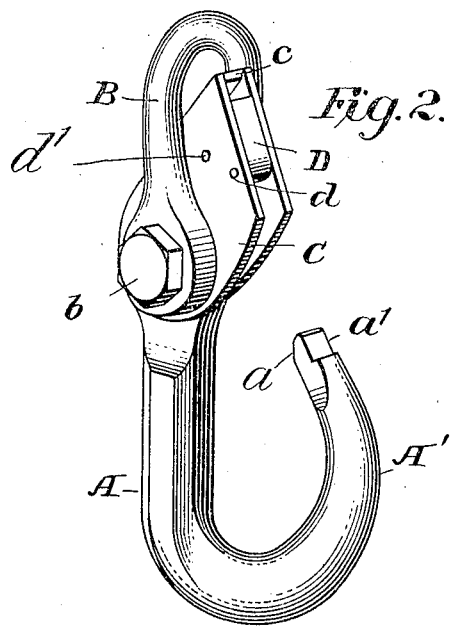
Figure 3:
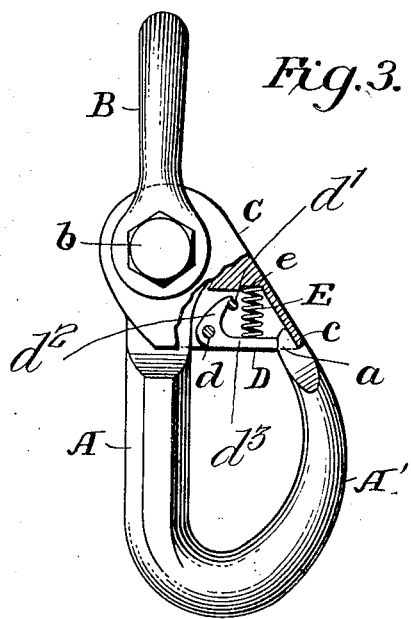
Figure 4:
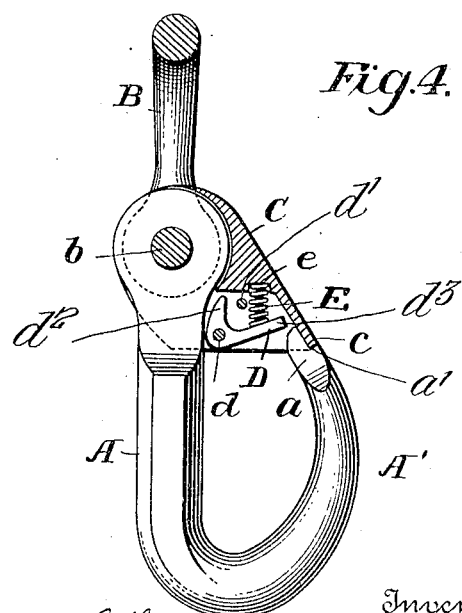

In the accompanying drawings, Figure 1 is a perspective view of our improved butt-hook with the latch or mousing closed. Fig. 2 is a similar view of the hook when open. Fig. 3 is a view mainly in side elevation with parts broken away to show how the dog locks the mousing to close the hook. Fig. 4 is a similar view showing the dog pressed back so that the hook may be easily opened by turning it on its pivot.

The eye of the hook proper A is preferably connected at its upper end with a shackle B by means of a pin $b$ which passes through one arm of the shackle through the eye of the hook and screws into the opposite arm of the shackle. The hook and shackle are thus pivotally connected with each other.

The latch or mousing C is pivoted on the pin $b$ between the arms of the shackle and it is recessed to receive the eye of the hook.

It is free to turn about the axis of the pin $b$, in the manner shown in Figs. 1 and 2, and when raised the mousing passes between the arms of the shackle.

The sides and front face of the mousing are closed, but it is recessed, as shown, to receive the locking dog D. The bill A' of the hook is formed on its outer side with a recess $a'$ to receive the lower end $c$ of the front wall of the mousing and when the parts are together, as indicated in Fig. 1, the hook, as a whole, presents a smooth surface not apt to engage or become entangled with obstructions.

Within the recess of the mousing is a dog D pivoted at $d$ and normally pressed outward or away from the pivot pin $b$ by means of a spring E bearing against a shoulder $e$ formed on the inside of the front wall of the mousing. The outward movement of the dog is limited by a pin $d'$ which engages the arm $d^2$ of the dog. The arm $d^3$ of the dog is adapted to engage the end $a$ of the bill of the hook in rear of the recess $c$. When the hook is closed, as indicated in Figs. 1 and 3, the end $c$ of the front wall of the mousing enters the recess $a'$ in the bill of the hook and the dog bears against the end $a$ of the bill and securely locks the mousing in position. The dog cannot accidentally be moved out of place, being sufficiently shielded by the construction of the mousing, but when it is desired to open the hook, the dog can readily be pressed inward, in the manner indicated in Fig. 4, and then the hook can be opened, in the manner indicated in Fig. 2.

While our improvements are especially designed for use in what are known as butt-hooks, they may be embodied in other kinds of hooks, particularly those of the general class of snap-hooks.

We claim as our invention:—

1. The combination of the hook proper having an eye at one end and a bill at the other, the mousing pivotally connected with the eye of the hook, adapted to swing upward and formed with a recess on its inner side to receive a locking dog, and a locking dog pivoted within said recess operated from the inside of the hook and bearing against the inner side of the bill of the hook.

2. The combination of the hook proper having an eye at one end, a shackle, a bolt extending through the eye of the hook and pivotally connecting the hook with the shackle, a mousing through which said bolt also extends and which pivotally connects it with the hook, and which is formed with a recess closed on opposite sides and at the front but open on its inner side between the bill and the eye of the hook, and a locking dog mounted within the recess engaging the inner side of the end of the bill and operable only through the open inner side of the mousing.

3. The combination of the hook proper having an eye at one end and a bill at the other, and formed with a recess at the upper end of the bill, a mousing hinged to the eye of the hook and having a recess closed at its opposite sides and at the front, the front wall of said recess being adapted to enter the recess in the bill, a shackle, a bolt pivotally connecting the shackle with the hook and extending through the eye of the hook, and a locking dog within the recess of the mousing which normally closes said recess and which is adapted to engage the outer end of the bill of the hook.

4. The combination of the hook proper having an eye at one end and a bill at the other, and formed with a recess at the outer end of the bill, a shackle, a bolt extending through the eye of the hook and pivotally connecting the shackle with the hook, a mousing pivoted to the eye of the hook by said bolt, between the arms of the shackle and having a recess closed on opposite sides and at the front, the lower end of the front wall of the mousing being adapted to enter the recess in the bill of the hook, and a locking dog within the recess adapted to engage the outer end of the bill.

In testimony whereof, we have hereunto subscribed our names.

ROLLA WATERHOUSE.
VAN WATERHOUSE.

Witnesses:
WALTER L. TOOZE,
W. F. NICHOLS.